March 5, 1929.   F. M. DAVIS   1,704,080
CONTINUOUS BORING AND DRILLING MACHINE
Filed July 30, 1923   2 Sheets-Sheet 1

March 5, 1929. F. M. DAVIS 1,704,080
CONTINUOUS BORING AND DRILLING MACHINE
Filed July 30, 1923 2 Sheets-Sheet 2

WITNESSES
M. E. Downey
C. L. Neal

INVENTOR
Frank M. Davis
By R. S. Caldwell
ATTORNEY

Patented Mar. 5, 1929.

1,704,080

UNITED STATES PATENT OFFICE.

FRANK M. DAVIS, OF MILWAUKEE, WISCONSIN.

CONTINUOUS BORING AND DRILLING MACHINE.

Application filed July 30, 1923. Serial No. 654,700.

This invention relates to continuously operating machines for boring and drilling and for various other operations and has for its object to provide means for advancing and withdrawing the tool with respect to the traveling work and still permit of a ready adjustment to position the tool with respect to the tool advancing and retarding means and thereby definitely determine the depth of cut. An object of the invention is to provide such a machine with a revolving work carrier and suitably driven parallel tool spindles revolving therewith and stationary cam means mounted on the work carrier for causing the tool spindles to advance and recede, such cam means being located inside of the path of travel of the spindles and driven from the work carrier in the opposite direction thereto so as to remain stationary.

Another object of the invention is to simplify the mechanical construction by which this inside feed and external adjustment of the revolving work spindles may be accomplished.

With the above and other objects in view the invention consists in the continuous boring and drilling machine as herein claimed, its parts and combinations of parts and all equivalents.

Figure 1:
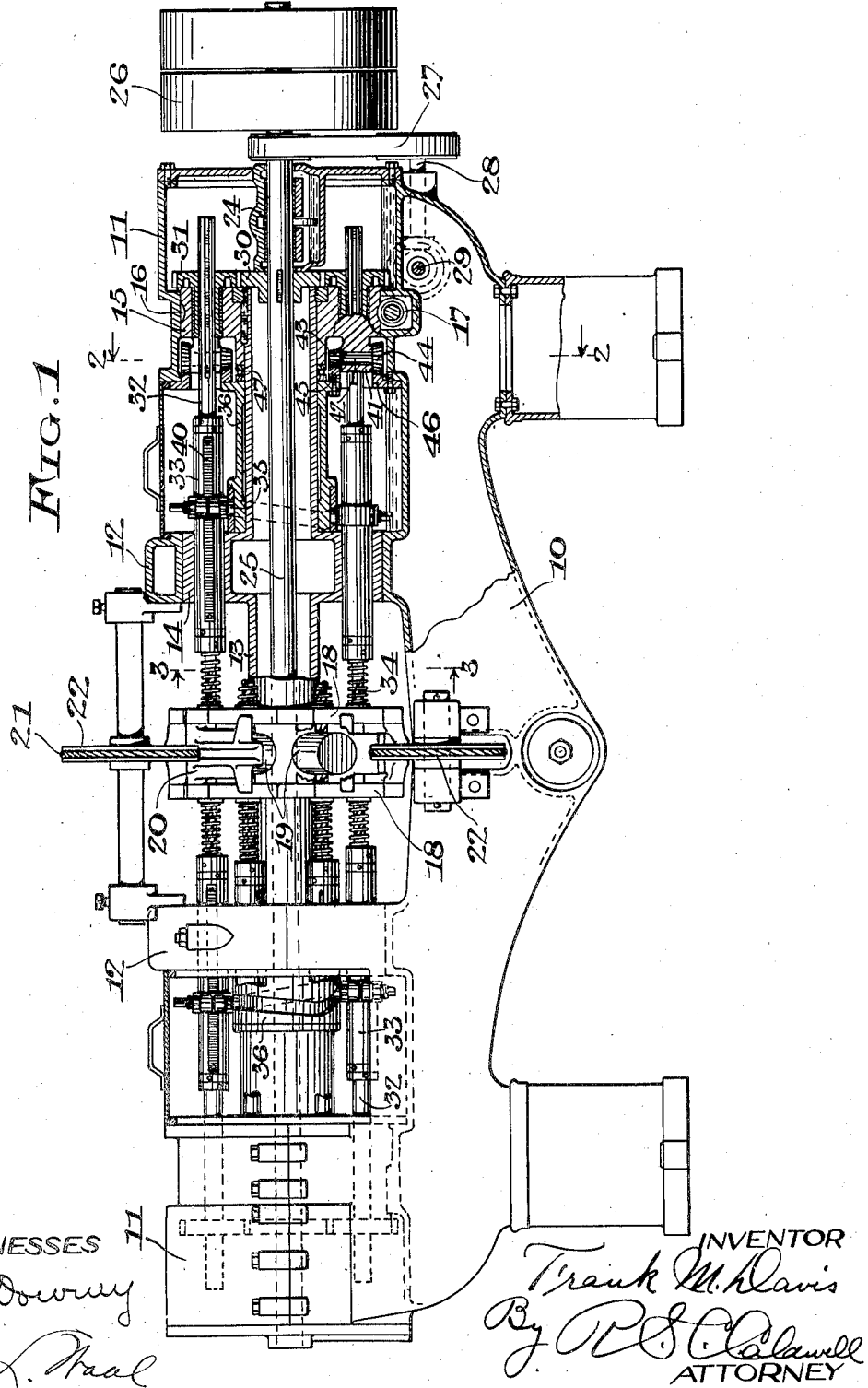
Figure 2:
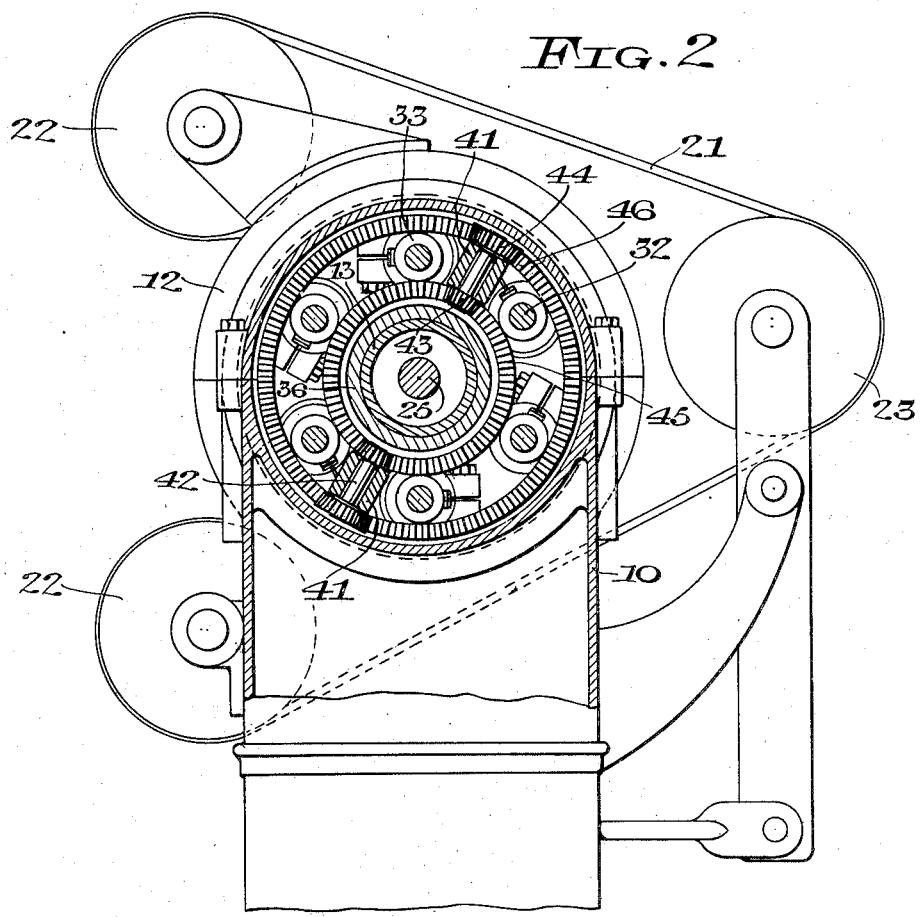
Figure 3:
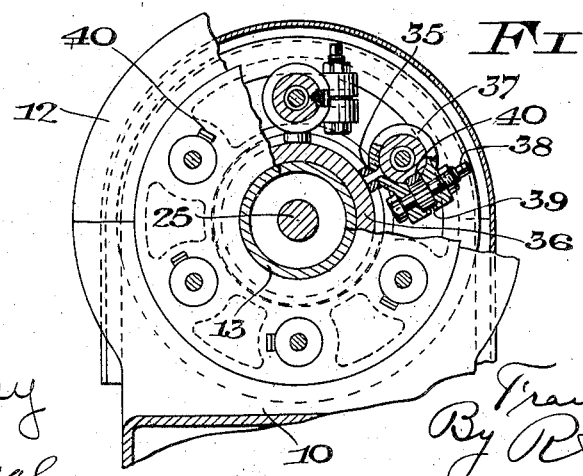

Referring to the accompanying drawings in which like characters of reference indicate the same parts in different views, Fig. 1 is a longitudinal sectional elevation of a continuous boring and drilling machine showing one embodiment of the present invention;

Fig. 2 is a transverse sectional view thereof on the plane of line 2—2 of Fig. 1, and Fig. 3 is a sectional view on the plane of line 3—3 of Fig. 1, a part thereof being broken away on the plane of the cam groove.

In the drawings a continuous boring and drilling machine is shown as embodying the invention though the nature of the cutting operation performed by the tools may be varied to suit the circumstances, as for screw-threading and other tool operations requiring a longitudinal feed.

The machine illustrated is one in which tool operation is performed on opposite sides of the work as for boring the wrist-pin openings in the opposite sides of gas engine pistons though, of course, the invention is suitable for use with work of a different character and for operations on one side as well as for operations on both sides of the work.

It will be understood that in the present machine, with the exception of the driving connections, the structure at one end of the machine is duplicated at the other end and the description of one will suffice.

In the drawings 10 indicates the machine frame which forms a gear housing 11 at each end and a large diameter bearing 12 spaced therefrom. A hollow work arbor 13 extends practically the full length of the machine or from one gear housing to the other, with enlargements 14 rotatably fitting in the bearings 12 so that the arbor as a whole is capable of being turned in said bearings. Keyed on the ends of the arbor are head members 15 forming additional bearings for the arbor by rotatably fitting in the reduced portions of the gear housings and one of these heads is provided with worm teeth 16 engaged by a worm 17 for turning the arbor.

At the center of the work arbor 13 it is provided with a pair of spaced flanges 18 between which the pieces of work, in this instance pistons 19, are clamped on work holders by means of swinging work clamps 20 pivotally mounted between said flanges and engaged by an endless cable 21 mounted in guide pulleys 22 and a tensioning pulley 23 in the manner covered by my patent for feeding and clamping means for metal working machines, No. 1,415,530, dated May 9, 1922. This arrangement permits of the finished work being removed while the tools are out of engagement therewith and substituted by other pieces requiring the operation performed by the machine, while the work arbor continues its turning movement, so that the operation of the machine is continuous.

Extending through the hollow work arbor from one end of the machine to the other and mounted in suitable bearings 24 in the gear housings 11 is a driving shaft 25 which may be driven in any suitable manner as by means of a belt pulley 26 on one end. The drive for the worm 17 may conveniently be taken from this drive shaft as by means of a belt 27 and shafts 28 and 29 having suitable gearing connections with each other and with said worm. Keyed on the drive shaft 25 in each gear housing at the end of the work arbor is a gear 30 and meshing therewith are a number of spindle driving pinions 31 rotatably mounted in the head 15, and tool-carrying spindles 32 are splined in them so as to be capable of sliding longitudinally while being driven thereby. Each tool spindle 32, besides having its driving connection with the pinion 31 as above described, has a bearing within a feed tube 33, which does not rotate with the spindle but is slidably mounted through the enlargement 14 of the work arbor and is capable of sliding the spindle 32 longitudinally because of its ends being confined between end thrust collars fixed on the spindle. Work cutting tools 34 held in suitable chucks on the ends of the spindles pass through guide openings in the flanges 18 of the work carrying arbor so as to operate on the work as the spindles are moved longitudinally. To accomplish the longitudinal movement of the tool spindles each spindle feeding tube 33 is provided with a roller 35 traveling in a cam groove of a cam sleeve 36. Each roller is carried by a split collar 37, which surrounds the spindle feeding tube 33 and is free to slide thereon when in an unclamped condition. A bolt 38 passing through its ends serves to clamp it to the spindle feeding tube, however. This bolt, furthermore, constitutes a means for adjusting the tube in the collar. For this purpose its projecting end is squared so that it may be turned when its nut is loose, and keyed on it and contained between the split ends of the collar is a pinion 39 meshing with a rack 40 which is secured to the tube. As the bolt is turned by means of a wrench fitting on its squared end the pinion 39 rides along the rack and since the roller is confined within the the cam groove the tube 33 and its spindle are forced to move longitudinally to adjust the position of the tool. When this adjustment is accomplished the tightening of the nut on bolt 38 securely clamps the parts together against further change in their relation. The projecting rack 40 on the side of the spindle feeding tube 33 fits in a keyway in the projection 14 of the work arbor to hold the roller in the cam groove.

Although the cam sleeve 36 is mounted upon the rotating arbor 13 inside of the revolving spindles so that the spindle adjusting means may be accessible, it must be held stationary, and to accomplish this purpose I provide means for causing the turning of the arbor to produce a driving action on the cam tending to drive the cam in the opposite direction and at the same speed. Such means consists of a planetary gear connection between the stationary frame and the cam sleeve, the planetary elements being carried by the arbor. As shown, two or more bearing brackets 41 project from the head member 15 of the work arbor between the spindles 32 and carry short shafts 42 which are radial to the arbor and carry beveled pinions 43 and 44 at their ends meshing with beveled rack rings 45 and 46 on the cam sleeve and gear housing respectively.

The turning of the arbor causes the outer beveled pinions 44 to ride around the stationary rack ring 46, thus turning the shafts 42 and pinions 43 so that the latter, meshing with the gear ring 45 on the cam sleeve, tends to drive the cam sleeve in the opposite direction to the turning of the arbor. As the gear ratios are the same, this driving of the cam sleeve in the opposite direction to the turning of the arbor is at the same speed and, consequently, the two driving actions being equal and opposite, the cam sleeve remains stationary. To take the end thrust of the cam sleeve incident to the feed of the tool to the work, a ball bearing 47 may be provided between the cam sleeve and the arbor head member 15.

In operation the worm driven arbor not only carries the work through a circuit of travel from a point where it receives the work to a point where it is released, but it also carries the tools which are automatically caused to advance and operate upon the work while it is traveling in this circuit. By means of this invention the degree of penetration of the tool within the work, or in other words the depth of cut, may readily be varied to suit the requirements by the adjustment provided for the tool spindle within the cam roller collar. For the convenience of this adjusting operation the cam means is placed behind the spindles and this location is made possible by the planetary gearing for holding it stationary notwithstanding that it is mounted on and practically surrounded by parts rotating with the arbor.

By way of explanation it might be noted that the coiled springs surrounding the tools are merely for holding a washer keyed in the tool groove against the side of the flange 18 while the tool moves in and out, such keyed washer serving to clear the metal shavings from the groove of the tool. Cover plates are provided for the spaces between the bearings 12 and the gear housings and they are made readily removable for accomplishing the tool adjustment.

What I claim as new and desire to secure by Letters Patent is:

1. In combination, a support, a rotatably mounted work carrying arbor, suitably driven tool spindles carried by the arbor, spindle feeding cam means mounted on the arbor between the axis of rotation and the spindles, and planetary gearing carried by the arbor for maintaining the cam means stationary.

2. In combination, a support, a rotatably mounted work carrying arbor, suitably driven tool spindles carried thereby, spindle feeding cam means mounted on the arbor and behind the tool spindles, means for adjusting the tool spindles with relation to the cam means, a stationary member, and a gearing connection carried by the arbor and engaging the stationary member and the cam means for holding the cam means stationary.

3. In combination, a support, a rotatably mounted work carrying arbor, tool spindles carried thereby with their axes parallel with the arbor axis, cam means mounted to rotate on the arbor and having connection with the spindles for moving them longitudinally, and means carried by the arbor and engaging the cam means for driving the cam means in the opposite direction to the arbor and at the same speed whereby said cam means remains stationary.

4. In combination, a support, a rotatably mounted work carrying arbor, tool spindles mounted to rotate therewith, cam means rotatably mounted on the arbor for moving the tool spindles longitudinally, adjustable means connecting the cam means with the tool spindles, and means carried by the arbor for driving the cam means in the opposite direction to the arbor and at the same speed whereby the cam means remains stationary.

5. In combination, a support, a rotatable work carrying arbor, suitably driven tool spindles carried by the arbor, a cam sleeve rotatably mounted on the arbor and having connection with the spindles for moving them longitudinally, a rack ring on the cam sleeve, a stationary rack ring, and a shaft carried by the arbor and having pinions meshing with both of said rack rings.

6. In combination, a support, a rotatable work carrying arbor, a cam sleeve rotatably mounted on the arbor, means on the arbor for driving the cam sleeve at an equal speed in the opposite direction to the arbor, a spindle sleeve splined in the arbor, a tool spindle carried thereby, and means on the spindle sleeve for engaging the cam sleeve.

7. In combination, a support, a rotatably mounted work carrying arbor, a cam sleeve rotatably mounted thereon, spindle sleeves slidably mounted in the arbor around the cam sleeve, racks on the spindle sleeves, clamping collars on the spindle sleeves, rollers on the clamping collars for engaging the cam sleeve, and bolts on the clamping collars for clamping them and provided with pinions meshing with the racks for adjusting the spindle sleeves in the collars when the bolt is turned.

8. In combination, a support, a rotatably mounted work carrying arbor having an enlargement fitting in a bearing, spindle sleeves splined through the enlargement, tool spindles carried thereby, a head member keyed to the arbor, a drive shaft passing through the arbor, a gear thereon, pinions splined on the spindles and meshing with said gear and rotatably mounted in the arbor head member, bearings carried by the arbor head member, shafts in said bearings, a cam sleeve rotatably mounted on the arbor between the enlargement and the arbor head, rollers carried by the spindle sleeves and engaging the cam sleeve, a rack ring on the cam sleeve, a stationary rack ring, and pinions on the shafts meshing with the rack rings.

9. In combination, a support, a rotatably mounted work-carrying arbor, a cam sleeve rotatably mounted thereon, means on the arbor for driving the cam sleeve at an equal speed in the opposite direction to the arbor, rotating tool spindles slidably mounted on the arbor, and means for feeding the spindles operated by the cam sleeve.

In testimony whereof I affix my signature.

FRANK M. DAVIS.